US012574871B2

(12) United States Patent
Sengupta et al.

(10) Patent No.: US 12,574,871 B2
(45) Date of Patent: Mar. 10, 2026

(54) INDICATION OF ENERGY LEVEL FOR RESYNCHRONIZATION SIGNAL

(71) Applicant: QUALCOMM Incorporated, San Diego, CA (US)

(72) Inventors: Ayan Sengupta, San Diego, CA (US); Le Liu, San Jose, CA (US); Alberto Rico Alvarino, San Diego, CA (US); Chao Wei, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 618 days.

(21) Appl. No.: 17/754,593

(22) PCT Filed: Oct. 11, 2019

(86) PCT No.: PCT/CN2019/110536
§ 371 (c)(1),
(2) Date: Apr. 6, 2022

(87) PCT Pub. No.: WO2021/068181
PCT Pub. Date: Apr. 15, 2021

(65) Prior Publication Data
US 2023/0156637 A1 May 18, 2023

(51) Int. Cl.
*H04W 56/00* (2009.01)
*H04L 5/00* (2006.01)
*H04W 24/10* (2009.01)
*H04W 52/36* (2009.01)

(52) U.S. Cl.
CPC ......... *H04W 56/001* (2013.01); *H04L 5/0051* (2013.01); *H04W 24/10* (2013.01); *H04W 52/36* (2013.01)

(58) Field of Classification Search
None
See application file for complete search history.

(56) References Cited

U.S. PATENT DOCUMENTS

| | | | |
|---|---|---|---|
| 10,117,152 B2 | 10/2018 | Wang et al. | |
| 11,297,519 B2 | 4/2022 | Kubota et al. | |
| 2009/0011757 A1* | 1/2009 | Tenny | H04W 48/20 455/425 |

(Continued)

FOREIGN PATENT DOCUMENTS

| | | |
|---|---|---|
| JP | WO2021064969 A1 | 4/2021 |
| WO | 2016081067 | 5/2016 |

(Continued)

OTHER PUBLICATIONS

3GPP TSG-TSG RAN WG1 Meeting # 96, R1-1903520.*

(Continued)

*Primary Examiner* — Abdelillah Elmejjarmi
(74) *Attorney, Agent, or Firm* — Harrity & Harrity, LLP

(57) ABSTRACT
Various aspects of the present disclosure generally relate to wireless communication. In some aspects, a user equipment (UE) may receive information indicating an offset of an energy level of a resynchronization signal (RSS) of a neighbor cell relative to a cell-specific reference signal (CRS) of the neighbor cell; and perform a measurement based at least in part on the offset. Numerous other aspects are provided.

30 Claims, 7 Drawing Sheets

(56) References Cited

U.S. PATENT DOCUMENTS

| | | | | |
|---|---|---|---|---|
| 2013/0235738 A1* | 9/2013 | Siomina | H04L 5/0053 | |
| | | | | 370/252 |
| 2014/0038597 A1* | 2/2014 | Wang | H04W 36/00835 | |
| | | | | 455/434 |
| 2016/0142994 A1 | 5/2016 | Luo et al. | | |
| 2016/0219446 A1* | 7/2016 | Ekici | H04W 24/10 | |
| 2016/0373995 A1 | 12/2016 | Kinthada Venkata et al. | | |
| 2017/0034840 A1 | 2/2017 | Mandil et al. | | |
| 2017/0064593 A1* | 3/2017 | Khay-Ibbat | H04W 36/00837 | |
| 2021/0195457 A1* | 6/2021 | Kim | H04L 5/0023 | |
| 2021/0306888 A1* | 9/2021 | Kim | H04W 24/08 | |
| 2022/0132446 A1* | 4/2022 | Astrom | H04L 1/1614 | |
| 2022/0217666 A1* | 7/2022 | Åström | H04W 56/0015 | |

FOREIGN PATENT DOCUMENTS

| | | |
|---|---|---|
| WO | 2016183025 | 11/2016 |
| WO | 2016209385 | 12/2016 |
| WO | 2017023345 | 2/2017 |
| WO | 2018009362 A2 | 1/2018 |
| WO | 2019063569 A1 | 4/2019 |

OTHER PUBLICATIONS

3GPP TSG-RAN WG1 Meeting #98bis, R1-1909994.*

3GPP TSG RAN WG1 Meeting #94-bis R1-1810655.*

Ericsson: "Use of RSS for Measurement Improvements in LTE-MTC", 3GPP TSG-RAN WG1 Meeting #98bis, R1-1909994, Chongqing, P.R. China, Oct. 14-20, 2019, Oct. 4, 2019 (Oct. 4, 2019), pp. 1-9, Section 2.

International Search Report and Written Opinion—PCT/CN2019/110536—ISAEPO—Jul. 3, 2020.

LG Electronics: "Discussion on the Use of RSS for Measurement Improvement", 3GPP TSG RAN WG1 Meeting #98bis, R1-1910811, Chongqing, China, Oct. 14-20, 2019, Oct. 5, 2019 (Oct. 5, 2019), 2 Pages, Section 1.

SONY: "Remaining Issues in Using RSS for Neighbour Cell Measurements", 3GPP TSG RAN WG1 #98bis, R1-1910741, Chongqing, China, Oct. 14-20, 2019, Oct. 4, 2019 (Oct. 4, 2019), 6 Pages, Section 2.

Taiwan Search Report—TW109131637—TIPO—Apr. 12, 2024.

LG Electronics: "Discussion on the Use of Rss for Measurement Improvement", R1-1810239, 3GPP TSG RAN WG1 Meeting #94bis, Discussion on the Use of Rss for Measurement Improvement, 3rd Generation Partnership Project, Mobile Competence Centre, 650, Route Des Lucioles, F-06921 Sophia-Antipolis Cedex, vol. RAN WG1, No. Chengdu, China, Oct. 8-12, 2018, Sep. 29, 2018, XP051517654, 8 Pages, Section 2.1.

Qualcomm Incorporated., et al., "EPRE for RSS", R1-1903520, 3GPP TSG-TSG RAN WG1 Meeting # 96, CR 36.213 MTC_RSS EPRE, 3rd Generation Partnership Project, Mobile Competence Centre, 650, Route Des Lucioles, F-06921 Sophia-Antipolis Cedex, France, vol. RAN WG1, No. Athens, Greece, Feb. 25, 2019-Mar. 1, 2019, Mar. 3, 2019, XP051690832, 4 Pages, Section 5.2.

SONY: "Considerations on Using RSS for Measurements", 3GPP TSG RAN WG1 Meeting #94- bis, R1-1810655, MTC_RSS, 3rd Generation Partnership Project, Mobile Competence Centre, 650, Route Des Lucioles, F-06921 Sophia-Antipolis Cedex, France, vol. RAN WG1, No. Chengdu, China, Oct. 8 -12, 2018, Sep. 28, 2018, XP051518061, 3 Pages, p. 2-p. 3, Section 3.

Supplementary European Search Report—EP19948238—Search Authority—The Hague—May 24, 2023.

ERICSSON: "Use of RSS for Measurement Improvements in LTE-MTC", R1-1909994, 3GPP TSG-RAN WG1 Meeting #98bis Chongqing, P.R. China, Oct. 14-20, 2019, pp. 1-9.

SONY: "Considerations on Using RSS For Measurements", R1-1810655, 3GPP TSG RAN WG1 Meeting #94-bis Chengdu, China, Oct. 8-12, 2018, 3 Pages.

Taiwan Search Report—TW109131637—TIPO—Jun. 14, 2025.

Ericsson: "Use of RSS for Measurement Improvements in LTE-MTC", 3GPP TSG-RAN WG1 Meeting #98bis Chongqing, R1-1909994, P.R. China, Oct. 14, 2019-Oct. 20, 2019, Oct. 5, 2019, pp. 1-9.

Qualcomm Incorporated, et al., "EPRE for RSS", 3GPP TSG-TSG Ran WG1 Meeting #96, R1-1903520, Athens, Greece, Feb. 25, 2019-Mar. 1, 2019, Mar. 3, 2019, 4 Pages.

Sony: "Considerations on Using RSS For Measurements", R1-1810655, 3GPP TSG RAN WG1 Meeting #94-bis Chengdu, China, Oct. 8, 2018-Oct. 12, 2018, Oct. 8-12, 2018, Sep. 28, 2018, 3 Pages.

* cited by examiner

400

410 Receive information indicating an offset of an energy level of an RSS of a neighbor cell relative to a CRS of the neighbor cell 420 Perform a measurement based at least in part on the offset Receive, from a neighbor base station associated with a neighbor cell, information indicating an offset of an energy level of an RSS of the neighbor cell relative to a CRS of the neighbor cell

510

Transmit a neighbor cell list including the information indicating the offset

520

500

600

610 Determine an offset of an energy level of an RSS of the base station relative to a CRS of the base station 620 Transmit the RSS and the CRS in accordance with the offset

700

1-port (p = 1)

| $P_B$ | $\dfrac{\rho_B}{\rho_A}$ | $p \times \min(\rho_A, \rho_B)$ | RSS power boost | | | |
|---|---|---|---|---|---|---|
| | | | 0dB | 3dB | 4.8dB | 6dB |
| 0 | 1 | 1 | $EPRE_{RSS-CRS} = 0.00$ | $EPRE_{RSS-CRS} = 3.00$ | $EPRE_{RSS-CRS} = 4.80$ | $EPRE_{RSS-CRS} = 6.00$ |
| 1 | 4/5 | 2/5 | $EPRE_{RSS-CRS} = -3.98$ | $EPRE_{RSS-CRS} = -0.98$ | $EPRE_{RSS-CRS} = 0.82$ | $EPRE_{RSS-CRS} = 2.02$ |
| 2 | 3/5 | 1/5 | $EPRE_{RSS-CRS} = -6.99$ | $EPRE_{RSS-CRS} = -3.99$ | $EPRE_{RSS-CRS} = -2.19$ | $EPRE_{RSS-CRS} = -0.99$ |
| 3 | 2/5 | 1/10 | $EPRE_{RSS-CRS} = -10$ | $EPRE_{RSS-CRS} = -7$ | $EPRE_{RSS-CRS} = -5.20$ | $EPRE_{RSS-CRS} = -4.00$ |

2-port (p = 2)

| $P_B$ | $\dfrac{\rho_B}{\rho_A}$ | $p \times \min(\rho_A, \rho_B)$ | RSS power boost | | | |
|---|---|---|---|---|---|---|
| | | | 0dB | 3dB | 4.8dB | 6dB |
| 0 | 5/4 | 2 | $EPRE_{RSS-CRS} = 3.01$ | $EPRE_{RSS-CRS} = 6.01$ | $EPRE_{RSS-CRS} = 7.81$ | $EPRE_{RSS-CRS} = 9.01$ |
| 1 | 1 | 1 | $EPRE_{RSS-CRS} = 0.00$ | $EPRE_{RSS-CRS} = 3.00$ | $EPRE_{RSS-CRS} = 4.80$ | $EPRE_{RSS-CRS} = 6.00$ |
| 2 | 3/4 | 1/2 | $EPRE_{RSS-CRS} = -3.01$ | $EPRE_{RSS-CRS} = -0.01$ | $EPRE_{RSS-CRS} = 1.79$ | $EPRE_{RSS-CRS} = 2.99$ |
| 3 | 1/2 | 1/4 | $EPRE_{RSS-CRS} = -6.02$ | $EPRE_{RSS-CRS} = -3.02$ | $EPRE_{RSS-CRS} = -1.22$ | $EPRE_{RSS-CRS} = -0.02$ |

4-port (p=4)

| $P_B$ | $\dfrac{\rho_B}{\rho_A}$ | $p \times \min(\rho_A, \rho_B)$ | RSS power boost | | | |
|---|---|---|---|---|---|---|
| | | | 0dB | 3dB | 4.8dB | 6dB |
| 0 | 5/4 | 4 | $EPRE_{RSS-CRS} = 6.02$ | $EPRE_{RSS-CRS} = 9.02$ | $EPRE_{RSS-CRS} = 10.82$ | $EPRE_{RSS-CRS} = 12.02$ |
| 1 | 1 | 2 | $EPRE_{RSS-CRS} = 3.01$ | $EPRE_{RSS-CRS} = 6.01$ | $EPRE_{RSS-CRS} = 7.81$ | $EPRE_{RSS-CRS} = 9.01$ |
| 2 | 3/4 | 1 | $EPRE_{RSS-CRS} = 0.00$ | $EPRE_{RSS-CRS} = 3.00$ | $EPRE_{RSS-CRS} = 4.80$ | $EPRE_{RSS-CRS} = 6.00$ |
| 3 | 1/2 | 1/2 | $EPRE_{RSS-CRS} = -3.01$ | $EPRE_{RSS-CRS} = -0.01$ | $EPRE_{RSS-CRS} = 1.79$ | $EPRE_{RSS-CRS} = 2.99$ |

FIG. 7

INDICATION OF ENERGY LEVEL FOR RESYNCHRONIZATION SIGNAL

CROSS-REFERENCE TO RELATED APPLICATION

This application is a 371 national stage of Patent Cooperation Treaty (PCT) Application No. PCT/CN2019/110536 filed on Oct. 11, 2019, entitled "INDICATION OF ENERGY LEVEL FOR RESYNCHRONIZATION SIGNAL," which is hereby expressly incorporated by reference herein.

TECHNICAL FIELD

Aspects of the technology described below generally relate to wireless communication and to techniques and apparatuses for indication of an energy level for a resynchronization signal (RSS). Some techniques and apparatuses described herein enable and provide wireless communication devices and systems configured for enhanced network coverage and improved radio resource management.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3 GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. A BS may be referred to as a Node B, a gNB, an access point (AP), a radio head, a transmit receive point (TRP), a new radio (NR) BS, a 5B Node B, and/or the like.

Multiple access technologies have been adopted in various telecommunication standards. Wireless communication standards provide common protocols to enable different devices (e.g., user equipment) to communicate on a municipal, national, regional, and even global level. New radio (NR), which may also be referred to as 5B, is a set of enhancements to the LTE mobile standard promulgated by the Third Generation Partnership Project (3GPP). As demand for mobile broadband access continues to increase, there exists a need for further improvements in LTE and NR technologies. These improvements can apply to other multiple access technologies and the telecommunication standards that employ these technologies.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. The purpose of the summary is to present some concepts of one or more aspects of the disclosure in summary form as a prelude to the more detailed description that is presented later.

Some UEs may use a low-power or limited-bandwidth configuration, such as bandwidth-limited (BL) UEs, coverage-enhancement (CE) UEs, and/or the like. Such UEs may enter a sleep mode for long periods of time in order to conserve battery power in between active periods. In a sleep period of a UE, synchronization with a serving cell may drift. A resynchronization signal (RSS) may facilitate faster resynchronization to the serving cell after a sleep period in comparison to synchronization using a primary synchronization signal (PSS), a secondary synchronization signal (SSS), a physical broadcast channel (PBCH), and/or the like. For example, the PSS, SSS, and/or PBCH may be transmitted infrequently and may use relatively small resource allocations, which complicates and delays synchronization. The RSS may use long, consistent resource allocations (e.g., tens of milliseconds), which may simplify detection for UEs awakening from a long sleep period in which synchronization has drifted.

A UE may use a downlink reference signal, such as an RSS or a cell-specific reference signal (CRS), to perform a measurement, such as a radio resource management (RRM) measurement on a neighbor cell and/or the like. In order to perform a measurement using the RSS, the UE may benefit from knowledge of the RSS configurations of neighbor cells, such as energy levels of RSSs to be transmitted by the neighbor cells. However, there may be overhead associated with signaling the RSS configuration of a neighbor cell, which may be proportionate to the complexity of the signaling. This overhead may reduce throughput and increase delay associated with configuring RRM measurement for the UE.

Techniques and apparatuses described herein provide signaling of an energy level. In some aspects, a signaled energy level may be associated with an RSS for a neighbor cell (e.g., in a neighbor cell list provided by a serving cell). In other aspects, the energy level associated with the RSS may be indicated relative to an energy level for a CRS of the neighbor cell. Doing so may conserve resources that would otherwise be used to indicate the energy level associated with the RSS relative to a baseline or absolute value. In some aspects, the energy level of the RSS may be signaled as an offset relative to the energy level of the CRS (e.g., a quantized offset). This can reduce overhead relative to explicit signaling of the energy level of the RSS relative to the energy level of the CRS. In some aspects, the energy level of the RSS may be signaled explicitly (e.g., using one or more parameters that may be used to determine the energy level of the RSS relative to the energy level of the CRS). Explicit signaling may provide improved precision relative to signaling the offset or a quantization of the offset. Furthermore, some techniques and apparatuses described herein may provide for combination of RSS-based and CRS-based measurements (e.g., when the relative power of the RSS and the CRS is in a particular range). Combined measurements of this nature may improve the accuracy and robustness of RRM measurement. Thus, RRM measurement(s) using an RSS is enabled and overhead associated with signaling an energy level for the RSS is reduced.

In some aspects, a method of wireless communication, performed by a user equipment (UE), may include receiving information indicating an offset of an energy level of an RSS of a neighbor cell relative to a CRS of the neighbor cell; and performing a measurement based at least in part on the offset.

In some aspects, a method of wireless communication, performed by a base station, may include receiving, from a neighbor base station associated with a neighbor cell, information indicating an offset of an energy level of an RSS of the neighbor cell relative to a CRS of the neighbor cell; and transmitting a neighbor cell list including the information indicating the offset.

In some aspects, a method of wireless communication, performed by a base station, may include determining an offset of an energy level of an RSS of the base station relative to a CRS of the base station; and transmitting the RSS and the CRS in accordance with the offset.

In some aspects, a base station for wireless communication may include memory and one or more processors operatively coupled to the memory. The memory and the one or more processors may be configured to receive information indicating an offset of an energy level of an RSS of a neighbor cell relative to a CRS of the neighbor cell; and perform a measurement based at least in part on the offset.

In some aspects, a base station for wireless communication may include memory and one or more processors operatively coupled to the memory. The memory and the one or more processors may be configured to receive, from a neighbor base station associated with a neighbor cell, information indicating an offset of an energy level of an RSS of the neighbor cell relative to a CRS of the neighbor cell; and transmit a neighbor cell list including the information indicating the offset.

In some aspects, a base station for wireless communication may include memory and one or more processors operatively coupled to the memory. The memory and the one or more processors may be configured to determine an offset of an energy level of an RSS of the base station relative to a CRS of the base station; and transmit the RSS and the CRS in accordance with the offset.

In some aspects, a non-transitory computer-readable medium may store one or more instructions for wireless communication. The one or more instructions, when executed by one or more processors of a UE, may cause the one or more processors to: receive information indicating an offset of an energy level of an RSS of a neighbor cell relative to a CRS of the neighbor cell; and perform a measurement based at least in part on the offset.

In some aspects, a non-transitory computer-readable medium may store one or more instructions for wireless communication. The one or more instructions, when executed by one or more processors of a base station, may cause the one or more processors to: receive, from a neighbor base station associated with a neighbor cell, information indicating an offset of an energy level of an RSS of the neighbor cell relative to a CRS of the neighbor cell; and transmit a neighbor cell list including the information indicating the offset.

In some aspects, a non-transitory computer-readable medium may store one or more instructions for wireless communication. The one or more instructions, when executed by one or more processors of a base station, may cause the one or more processors to: determine an offset of an energy level of an RSS of the base station relative to a CRS of the base station; and transmit the RSS and the CRS in accordance with the offset.

In some aspects, an apparatus for wireless communication may include means for receiving information indicating an offset of an energy level of an RSS of a neighbor cell relative to a CRS of the neighbor cell; and means for performing a measurement based at least in part on the offset.

In some aspects, an apparatus for wireless communication may include means for receiving, from a neighbor base station associated with a neighbor cell, information indicating an offset of an energy level of an RSS of the neighbor cell relative to a CRS of the neighbor cell; and means for transmitting a neighbor cell list including the information indicating the offset.

In some aspects, an apparatus for wireless communication may include means for determining an offset of an energy level of an RSS of the apparatus relative to a CRS of the apparatus; and means for transmitting the RSS and the CRS in accordance with the offset.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description is provided herein, with some aspects of the disclosure being illustrated in the appended drawings. However, the appended drawings illustrate only some aspects of this disclosure and are therefore not to be considered limiting of the scope of the disclosure. The same reference numbers in different drawings may identify the same or similar elements.

FIG. 7 is a diagram illustrating example tables of energy level offsets for RSSs relative to CRSs for neighbor cell measurement, in accordance with various aspects of the present disclosure.

DETAILED DESCRIPTION

Figure 1:
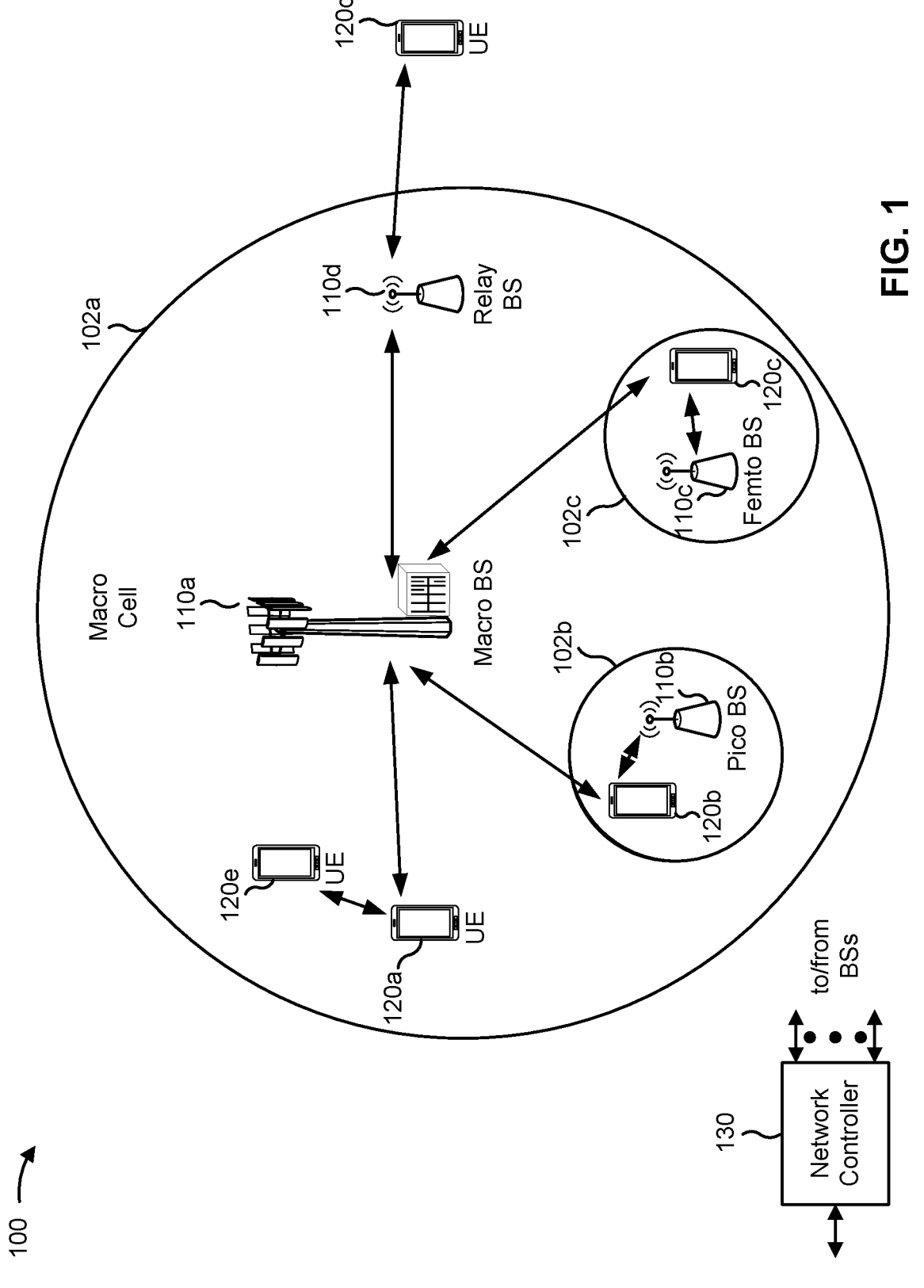
FIG. 1 is a block diagram conceptually illustrating an example of a wireless communication network, in accordance with various aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements" or "features"). These elements may be implemented using hardware, software, or combinations thereof. Whether such elements are implemented as hardware or software depends upon the particular application and design constraints imposed on the overall system.

While some aspects may be described herein using terminology commonly associated with 3G and/or 4G wireless technologies, aspects of the present disclosure can be applied in other generation-based communication systems, such as 5B and later, including NR technologies.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, and/or the like). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including one or more antennas, RF-chains, power amplifiers, modulators, buffers, processors, interleavers, adders/summers, and/or the like). It is intended that innovations described herein may be practiced in a wide variety of devices, chip-level components, systems, distributed arrangements, end-user devices, etc. of varying sizes, shapes, and constitution.

FIG. 1 is a diagram illustrating a wireless network 100 in which aspects of the present disclosure may be practiced. The wireless network 100 may be an LTE network or some other wireless network, such as a 5B or NR network. The wireless network 100 may include a number of BSs 110 (shown as BS 110*a*, BS 110*b*, BS 110*c*, and BS 110*d*) and other network entities. A BS is an entity that communicates with user equipment (UEs) and may also be referred to as a base station, a NR BS, a Node B, a gNB, a 5B node B (NB), an access point, a transmit receive point (TRP), and/or the like. Each BS may provide communication coverage for a particular area (e.g., a fixed or changing geographical area). In some scenarios, BSs 110 may be stationary or non-stationary. In some non-stationary scenarios, mobile BSs 110 may move with varying speeds, direction, and/or heights. In 3GPP, the term "cell" can refer to a coverage area of a BS 110 and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. Additionally, or alternatively, a BS may support access to an unlicensed RF band (e.g., a Wi-Fi band and/or the like). A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. ABS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. ABS may support one or multiple (e.g., three) cells. The terms "eNB", "base station", "NR BS", "gNB", "TRP", "AP", "node B", "5B NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network. In other scenarios, BSs may be implemented in a software defined network (SDN) manner or via network function virtualization (NFV) manner.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, robotics, drones, implantable devices, augmented reality devices, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like. These components may be integrated in a variety of combinations and/or may be stand-alone, distributed components considering design constraints and/or operational preferences.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110. A UE performing scheduling operations can include or perform base-station-like functions in these deployment scenarios.

As indicated above, FIG. 1 is provided merely as an example. Other examples may differ from what is described with regard to FIG. 1.

Figure 2:
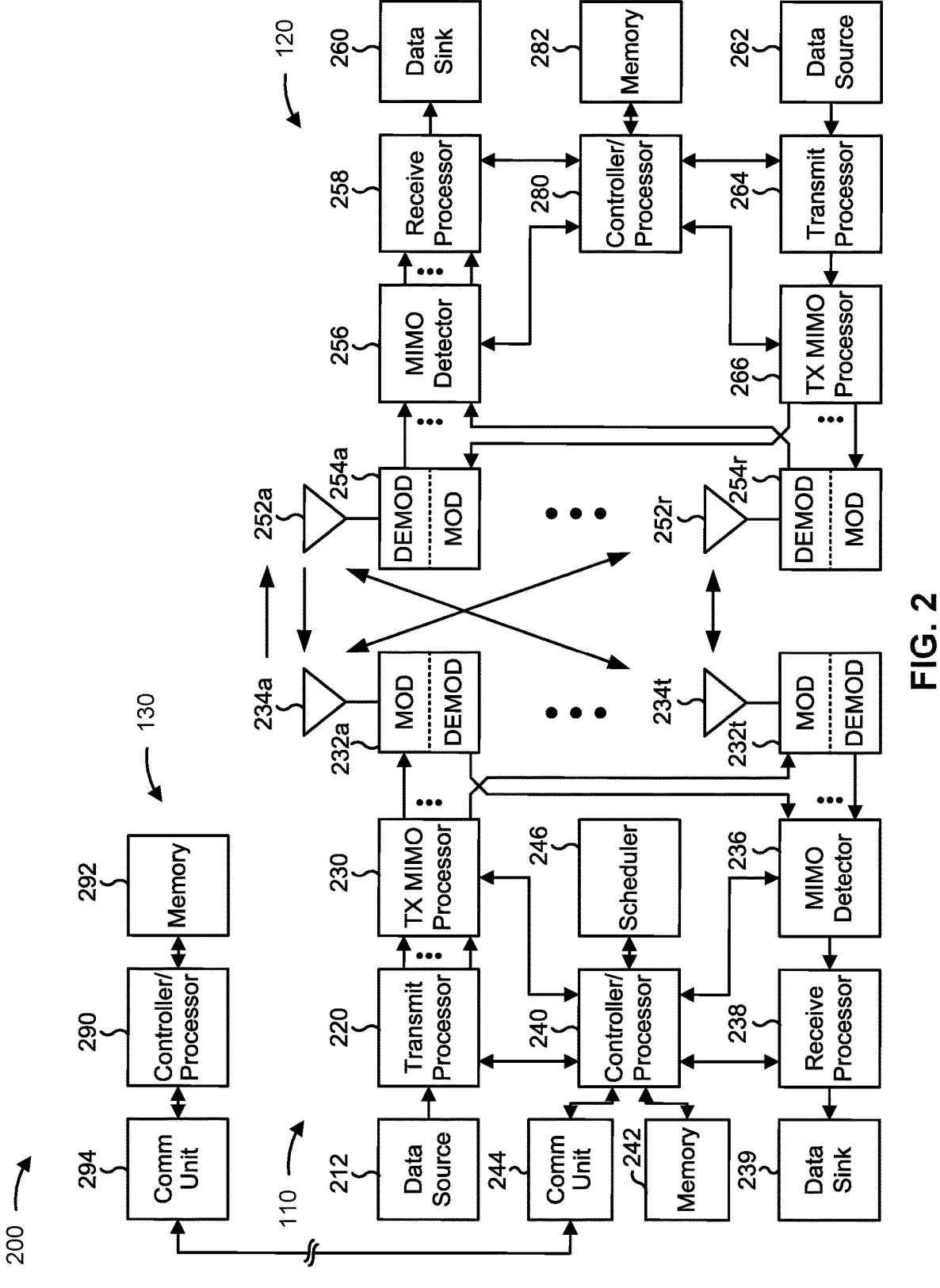
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1. The T and R antennas may be configured with multiple antenna elements formed in an array for MIMO or massive MIMO deployments that can occur in millimeter wave (mmWave or mmW) communication systems.

At base station 110, a transmit processor 220 can carry out a number of functions associated with communications. For example, transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for orthogonal frequency division multiplexing and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive downlink radio frequency (RF) signals. The downlink RF signals may be received from and/or may be transmitted by one or more base stations 110. The signals can be provided to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

For uplink communications, a UE 120 may transmit control information and/or data to another device, such as one or more base stations 110. For example, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with indication of an energy level for a resynchronization signal, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, process 600 of FIG. 6, and/or other processes as described herein. Memories 242 and 282 may store data and program codes for base station 110 and UE 120, respectively. A scheduler 246 may schedule UEs for data transmission on the downlink and/or uplink.

In some aspects, the UE 120 may include a variety of means or components for implementing communication functions. For example, the variety of means may include means for receiving information indicating an offset of an energy level of a resynchronization signal (RSS) of a neighbor cell relative to a cell-specific reference signal (CRS) of the neighbor cell; means for performing a measurement based at least in part on the offset; means for determining the energy level based at least in part on the offset; means for combining an RSS-based measurement and a CRS-based measurement to determine the measurement; and/or the like.

In some aspects, the UE 120 may include a variety of structural components for carrying out functions of the various means. For example, structural components that carry out functions of such means may include one or more components of UE 120 described in connection with FIG. 2, such as antenna 252, DEMOD 254, MOD 254, MIMO detector 256, receive processor 258, transmit processor 264, TX MIMO processor 266, controller/processor 280, and/or the like.

In some aspects, the base station 110 may include a variety of means or components for implementing communication functions. For example, the variety of means may include means for receiving, from a neighbor base station associated with a neighbor cell, information indicating an offset of an energy level of a resynchronization signal (RSS) of the neighbor cell relative to a cell-specific reference signal (CRS) of the neighbor cell; means for transmitting a neighbor cell list including the information indicating the offset; means for configuring a user equipment (UE) to perform a measurement when the offset is within a configured range; means for determining an offset of an energy level of a resynchronization signal (RSS) of the base station relative to a cell-specific reference signal (CRS) of the base station; means for transmitting the RSS and the CRS in accordance with the offset; and/or the like.

In some aspects, the base station 110 may include a variety of structural components for carrying out functions of the various means. For example, structural components that carry out functions of such means may include one or more components of base station 110 described in connection with FIG. 2, such as transmit processor 220, TX MIMO processor 230, DEMOD 232, MOD 232, antenna 234, MIMO detector 236, receive processor 238, controller/processor 240, and/or the like.

As indicated above, FIG. 2 is provided merely as an example. Other examples may differ from what is described with regard to FIG. 2.

Figure 3:
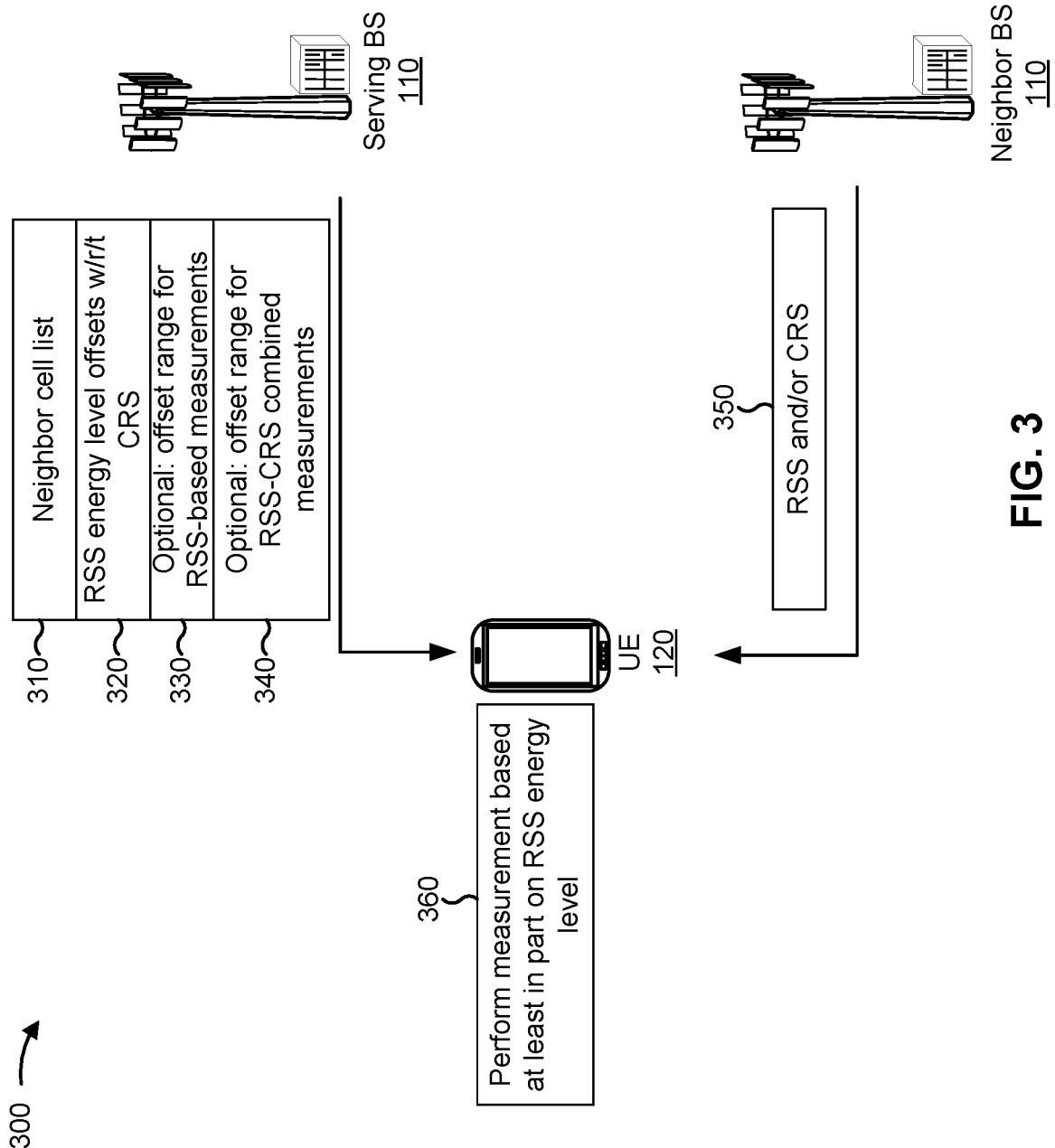
FIG. 3 is a diagram illustrating an example of configuration of an energy level of an RSS relative to a CRS for neighbor cell measurement, in accordance with various aspects of the present disclosure.

FIG. 3 is a diagram illustrating an example 300 of configuration of an energy level of a resynchronization signal (RSS) relative to a cell-specific reference signal (CRS) for neighbor cell measurement, in accordance with various aspects of the present disclosure. As shown, example 300 includes a serving BS 110, a neighbor BS 110, and a UE 120. Serving BS 110 may provide a serving cell of the UE 120, and neighbor BS 110 may provide a neighbor cell of the serving cell. In some aspects, serving BS 110 may be associated with a plurality of neighbor cells provided by one or more neighbor BSs 110. While the operations described in example 300 are often described with regard to a single neighbor cell and neighbor BS 110, these operations should be understood to be applicable for a plurality of neighbor cells and/or neighbor BSs 110. In some aspects, the serving cell and the neighbor cell may be associated with a same frequency, which may be referred to as intra-frequency. In some aspects, the serving cell and the neighbor cell may be associated with different frequencies, which may be referred to as inter-frequency.

As shown in FIG. 3, and by reference number 310, the serving BS 110 may provide a neighbor cell list to the UE 120. In some aspects, the serving BS 110 may provide the neighbor cell list using a system information block (SIB) (e.g., SIB2, SIB3, SIB4, SIB5, and/or the like). The neighbor cell list may identify neighbor cells for measurement (e.g., RRM measurement and/or the like). For example, the neighbor cell list may identify cell identifiers associated with the neighbor cells and/or parameters for measurement on the neighbor cells.

As shown by reference number 320, the neighbor cell list may identify an energy level of an RSS with regard to (e.g., relative to) a CRS. In some aspects, the energy level may be an energy per resource element (EPRE) of the RSS. Here, the neighbor cell list identifies an offset between the energy level of the RSS and an energy level of the CRS (e.g., respective EPREs of the RSS and the CRS). The identification of the energy level of the RSS relative to the CRS may enable measurement of the RSS concordant with or in combination with the CRS. Furthermore, the identification of the energy level of the RSS relative to the CRS may conserve resources and reduce overhead in comparison to identifying the energy level of the RSS relative to a baseline or absolute value. For example values of the offsets, refer to FIG. 7.

In some aspects, the neighbor cell list may identify an offset between the energy level of the RSS and the energy level of the CRS. As one example, the offset may be expressed in terms of decibels (dB). For example, the offset may be in a range of −10 dB to 12 dB. In some aspects, the offset may be quantized to Q bits, where Q is an integer. In some aspects, Q is less than 6. The quantization of the offset may reduce overhead relative to explicit signaling of the energy level of the RSS or parameters used to determine the energy level of the RSS for certain values of Q.

In some aspects, the neighbor cell list (e.g., the offset) may identify one or more parameters used to determine the energy level of the RSS relative to the CRS. For example, the EPRE of the RSS for a given cell may be determined as follows:

$$EPRE_{RSS} = powerBoost + 10 \log_{10}(p \times min(\rho_A^d, \rho_B^d)),$$

where powerBoost is a configured parameter referred to herein as a power boost parameter for the RSS ($\in\{0$ dB, 3 dB, 4.8 dB, 6 dB$\}$), p is a number of CRS ports used by the given cell ($\in\{1,2,4\}$), $P_B$ represents a power boost parameter of the CRS in the given cell, and parameters $\rho_A^d$ and $\rho_B^d$ are determined in accordance with a specified table (e.g., specified by 3GPP Technical Specification 36.213) based at least in part on values of $P_B$ and p. In this case, the neighbor cell list may identify powerBoost, $P_B$, and/or p.

Explicitly signaling the parameters described above may provide improved precision relative to quantizing the offset, whereas quantizing the offset may reduce overhead relative to explicitly signaling the parameters. For example, signaling values in the example ranges described above for powerBoost, $P_B$, and p may use 6 bits ($\log_2(4\times3\times4)$) per cell, so if the quantized offset uses less than 6 bits (i.e., Q<6), then the quantized offset may reduce overhead relative to explicitly signaling the parameters. In some aspects, the quantization may be configured so that CRS-based measurement and RSS-based measurement are concordant while reducing signaling overhead.

The offset associated with the RSS may be used to determine an RSS-based reference signal received power (RSRP) or a reference signal received quality (RSRQ). For example, when using CRS-based measurement, the UE 120 may determine a ranking for a serving cell as $R_s$ and a ranking for a neighbor cell as $R_n$. $R_s$ may be determined as $Qmeas_{,s} + Qhyst − Qoffsettemp$, where $Qmeas_{,s}$ is a measurement on the serving cell, Qhyst is a hysteresis value, and Qoffsettemp is a temporary offset value. $R_n$ may be determined as $Q_{meas,n} − Qoffset − Qoffset_{temp}$, where Qoffset identifies an offset of an energy level of the CRS of the neighbor cell relative to the energy level of the CRS of the serving cell (e.g., $Qoffset = Qoffset_{s,n}$ for intra-frequency measurement or $Qoffset = Qoffset_{s,n} + Qoffset_{frequency}$ for inter-frequency measurement, wherein $Qoffset_{frequency}$ is a frequency offset value).

The offset associated with the RSS may be an offset relative to the CRS of the neighbor cell, and the CRS of the neighbor cell may be defined by an offset relative to the CRS of the serving cell (e.g., Qoffset described above). For example, $Qoffset\_RSS = Qoffset_{s,n} + Delta\_offset\_RSS_{s,n}$, where $Delta\_offset\_RSS_{s,n}$ is the offset associated with the RSS relative to the CRS of the neighbor cell. In other words, in some aspects, $Delta\_offset\_RSS_{s,n}$ is the offset indicated by reference number 320. In some aspects, the offset associated with the RSS may be an offset relative to the CRS for the serving cell (e.g., $Qoffset\_RSS = Qoffset\_RSS_{s,n}$).

As shown by reference number 330, the neighbor cell list may optionally indicate an offset range based at least in part on which to perform RSS-based measurements. For example, the UE 120 may be configured not to perform RSS-based measurements when the offset between the RSS and the CRS of the neighbor cell is within a particular range. This range may be associated with a low CRS EPRE (leading to a high RSS EPRE) or a high CRS EPRE (leading to a low RSS EPRE). As an example, the ranges may be defined based at least in part on a ratio of $\rho_A^d$ and $\rho_B^d$. More particularly, the neighbor cell list may indicate that the UE 120 is not to perform measurements when $\rho_A^d/\rho_B^d$ is less than ½ or greater than 1. As another example, a particular value of the offset may indicate that the UE 120 is not to perform the RSS-based measurements. For example, if the offset is in a range of [−3, 9] using a 3-bit quantization, possible values of the offset may include {−3 −1 1 3 5 7 9}, corresponding to seven bit values. An eighth bit value may indicate that the RSS EPRE is outside of the range in which the RSS is to be used for neighbor cell measurements. Thus, the serving BS 110 may implicitly signal a range in which the UE 120 is to perform RSS-based measurements, thereby improving flexibility of such measurements and reducing reliance on imprecise or suboptimal measurements.

As shown by reference number 340, the neighbor cell list may optionally indicate an offset range based at least in part on which to perform combined measurements (e.g., based at least in part on combining an RSS and a CRS). For example, in some aspects, the UE 120 may perform a measure based at least in part on combining a CRS-based measurement and an RSS-based measurement. This may be based at least in part on capabilities of the UE 120, the presence or absence of RSS in the serving cell and/or the neighbor cell, and/or the like. In some aspects, the UE 120 may be configured with information indicating a range of offsets in which the UE 120 is to perform a combined measurement (e.g., by combining an RSS-based measurement and a CRS-based measurement). For example, the information indicating the range of offsets may be provided in the neighbor cell list, in a configuration message, may be specified in a technical specification, and/or the like. By performing the combined measurement based at least in part on the range, the UE 120 may ensure accuracy of the combined measurement within the range, and may conserve measurement resources that would otherwise be used to perform an inefficient or suboptimal measurement outside of the range.

As shown by reference number 350, the neighbor BS 110 may transmit the RSS and/or the CRS. For example, the neighbor BS 110 may transmit the RSS in accordance with the RSS EPRE defined by the offset relative to the CRS EPRE, and may transmit the CRS in accordance with the CRS EPRE. The CRS EPRE may be defined by an offset relative to a CRS EPRE of the serving BS 110. One or more of these offsets may be defined by the neighbor cell list, as described elsewhere herein.

As shown by reference number 360, the UE 120 may perform a measurement based at least in part on the energy level of the RSS. For example, the UE 120 may perform an RRM measurement or another type of measurement. In some aspects, the UE 120 may perform a combined measurement (e.g., based at least in part on the range described in connection with reference number 340, above). In some aspects, the UE 120 may selectively perform the measurement. For example, the UE 120 may not perform the measurement when the offset is in a particular range, or when the quantization of the offset uses a particular value, as described in more detail in connection with reference number 330. Thus, an RSS EPRE is indicated to the UE 120 relative to a power level of a CRS of the neighbor BS 110, which reduces signaling overhead relative to indicating the RSS EPRE relative to the power level of the CRS of the serving BS 110 or relative to a baseline or global value.

As indicated above, FIG. 3 is provided as an example. Other examples may differ from what is described with respect to FIG. 3.

Figure 4:
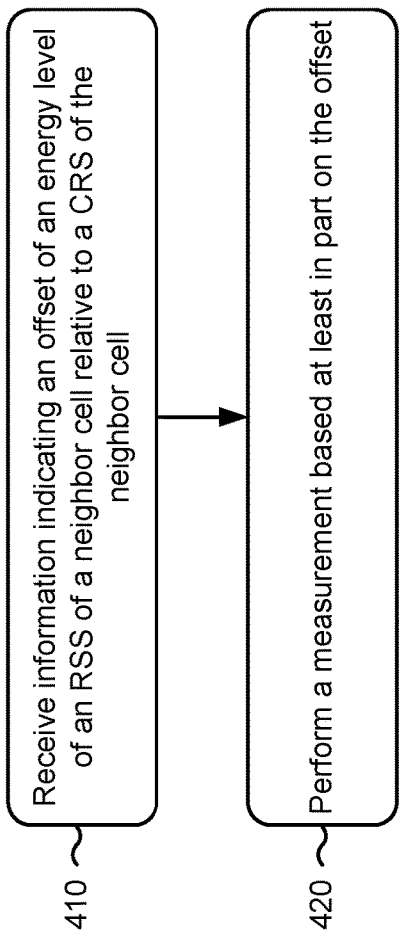
FIG. 4 is a diagram illustrating an example process performed, for example, by a user equipment, in accordance with various aspects of the present disclosure.

FIG. 4 is a diagram illustrating an example process 400 performed, for example, by a UE, in accordance with various aspects of the present disclosure. Example process 400 is an example where the UE (e.g., UE 120 and/or the like) performs operations associated with an indication of an energy level for a resynchronization signal.

As shown in FIG. 4, in some aspects, process 400 may include receiving information indicating an offset of an energy level of an RSS of a neighbor cell relative to a CRS of the neighbor cell (block 410). For example, the UE (e.g., using antenna 252, DEMOD 254, MIMO detector 256, receive processor 258, controller/processor 280, and/or the like) may receive information indicating an offset of an energy level of an RSS of a neighbor cell relative to a CRS of the neighbor cell, as described above.

As further shown in FIG. 4, in some aspects, process 400 may include performing a measurement based at least in part on the offset (block 420). For example, the UE (e.g., using antenna 252, DEMOD 254, MIMO detector 256, receive processor 258, controller/processor 280, and/or the like) may perform a measurement based at least in part on the offset, as described above.

Process 400 may include additional aspects, such as any single aspect or any combination of aspects described below and/or in connection with one or more other processes described elsewhere herein.

In a first aspect, the energy level is an energy per resource element (EPRE) of the RSS of the neighbor cell relative to an EPRE of the CRS of the neighbor cell.

In a second aspect, alone or in combination with the first aspect, the information indicating the offset is received in a neighbor cell list provided via a serving cell of the UE.

In a third aspect, alone or in combination with one or more of the first and second aspects, the neighbor cell list includes information identifying a plurality of offsets for respective neighbor cells of the serving cell.

In a fourth aspect, alone or in combination with one or more of the first through third aspects, the information indicating the offset of the energy level identifies a difference between the energy level of the RSS of the neighbor cell and an energy level of the CRS of the neighbor cell.

In a fifth aspect, alone or in combination with one or more of the first through fourth aspects, the information indicating the offset of the energy level comprises a quantization of the difference between the energy level of the RSS of the neighbor cell and the energy level of the CRS of the neighbor cell.

In a sixth aspect, alone or in combination with one or more of the first through fifth aspects, the offset of the energy level identifies at least one of: a power boost parameter of the RSS, a number of CRS ports used by the neighbor cell, or a power boost parameter of the CRS of the neighbor cell. The process 400 may further comprise determining the energy level based at least in part on the offset.

In a seventh aspect, alone or in combination with one or more of the first through sixth aspects, a range of the offset of the energy level is based at least in part on at least one of the power boost parameter of the RSS, the number of CRS ports, or the power boost parameter of the CRS of the neighbor cell.

In an eighth aspect, alone or in combination with one or more of the first through seventh aspects, the measurement is configured to be performed when the offset is within a configured range.

In a ninth aspect, alone or in combination with one or more of the first through eighth aspects, a particular value of the information indicating the offset of the energy level indicates that the offset is outside of the configured range and that the measurement is not to be performed.

In a tenth aspect, alone or in combination with one or more of the first through ninth aspects, performing the measurement based at least in part on the offset further comprises combining an RSS-based measurement and a CRS-based measurement to determine the measurement.

In an eleventh aspect, alone or in combination with one or more of the first through tenth aspects, combining the RSS-based measurement and the CRS-based measurement to determine the measurement is performed based at least in part on the offset of the energy level of the RSS of the neighbor cell relative to the CRS of the neighbor cell being within a range.

In a twelfth aspect, alone or in combination with one or more of the first through eleventh aspects, when the neighbor cell is associated with a different frequency than a serving cell of the UE, performing the measurement comprises performing the measurement based at least in part on the offset and based at least in part on a frequency offset.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
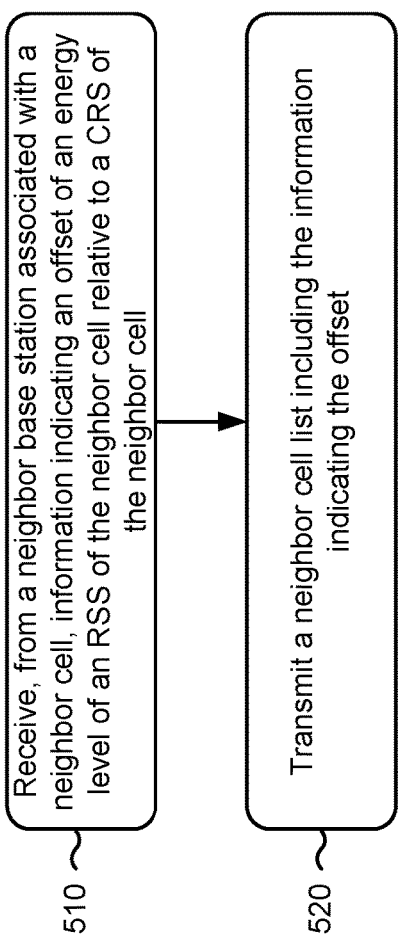
FIG. 5 is a diagram illustrating an example process performed, for example, by a base station, in accordance with various aspects of the present disclosure.

FIG. 5 is a diagram illustrating an example process 500 performed, for example, by a base station, in accordance with various aspects of the present disclosure. Example process 500 is an example where the base station (e.g., BS 110, serving BS 110, and/or the like) performs operations associated with indication of energy level for resynchronization signal.

As shown in FIG. 5, in some aspects, process 500 may include receiving, from a neighbor base station associated with a neighbor cell, information indicating an offset of an energy level of an RSS of the neighbor cell relative to a CRS of the neighbor cell (block 510). For example, the base station (e.g., using antenna 234, DEMOD 232, MIMO detector 236, receive processor 238, controller/processor 240, and/or the like) may receive, from a neighbor base station associated with a neighbor cell, information indicating an offset of an energy level of an RSS of the neighbor cell relative to a CRS of the neighbor cell, as described above.

As further shown in FIG. 5, in some aspects, process 500 may include transmitting a neighbor cell list including the information indicating the offset (block 520). For example, the base station (e.g., using controller/processor 240, transmit processor 220, TX MIMO processor 230, MOD 232, antenna 234, and/or the like) may transmit a neighbor cell list including the information indicating the offset, as described above.

Process 500 may include additional aspects, such as any single aspect or any combination of aspects described below and/or in connection with one or more other processes described elsewhere herein.

In a first aspect, the energy level is an energy per resource element (EPRE) of the RSS of the neighbor cell relative to an EPRE of the CRS of the neighbor cell.

In a second aspect, alone or in combination with the first aspect, the neighbor cell list includes information identifying a plurality of offsets for respective neighbor cells of the base station.

In a third aspect, alone or in combination with one or more of the first and second aspects, the information indicating the offset of the energy level identifies a difference between the energy level of the RSS of the neighbor cell and an energy level of the CRS of the neighbor cell.

In a fourth aspect, alone or in combination with one or more of the first through third aspects, the information indicating the offset of the energy level comprises a quantization of the difference between the energy level of the RSS of the neighbor cell and the energy level of the CRS of the neighbor cell.

In a fifth aspect, alone or in combination with one or more of the first through fourth aspects, the offset of the energy level identifies at least one of: a power boost parameter of the RSS, a number of CRS ports used by the neighbor cell, or a power boost parameter of the CRS of the neighbor cell.

In a sixth aspect, alone or in combination with one or more of the first through fifth aspects, a range of the offset of the energy level is based at least in part on at least one of the power boost parameter of the RSS, the number of CRS ports, or the power boost parameter of the CRS of the neighbor cell.

In a seventh aspect, alone or in combination with one or more of the first through sixth aspects, process 500 includes configuring a UE to perform a measurement when the offset is within a configured range.

In an eighth aspect, alone or in combination with one or more of the first through seventh aspects, a particular value of the information indicating the offset of the energy level indicates that the offset is outside of the configured range and that the measurement is not to be performed.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
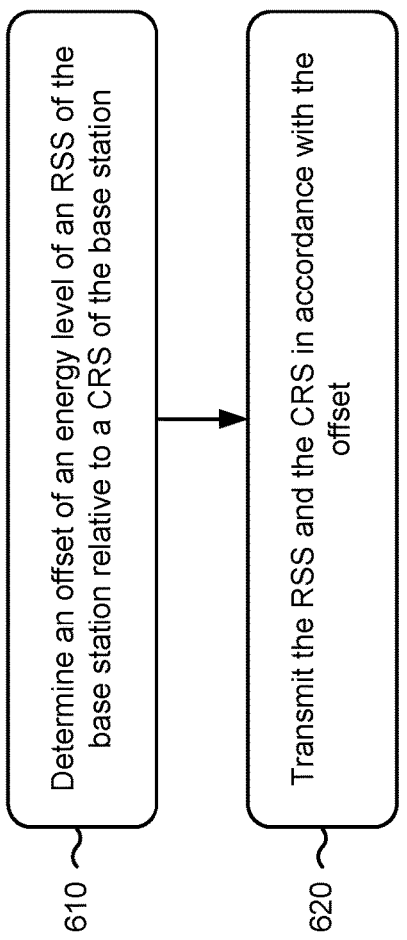
FIG. 6 is a diagram illustrating an example process performed, for example, by a base station, in accordance with various aspects of the present disclosure.

FIG. 6 is a diagram illustrating an example process 600 performed, for example, by a base station, in accordance with various aspects of the present disclosure. Example process 600 is an example where the base station (e.g., BS 110, neighbor BS 110, and/or the like) performs operations associated with indication of an energy level for a resynchronization signal.

As shown in FIG. 6, in some aspects, process 600 may include determining an offset of an energy level of an RSS of the base station relative to a CRS of the base station (block 610). For example, the base station (e.g., using controller/processor 240 and/or the like) may determine an offset of an energy level of an RSS of the base station relative to a CRS of the base station, as described above.

As further shown in FIG. 6, in some aspects, process 600 may include transmitting the RSS and the CRS in accordance with the offset (block 620). For example, the base station may transmit the RSS and the CRS in accordance with the offset, as described above.

Process 600 may include additional aspects, such as any single aspect or any combination of aspects described in connection with process 400 and process 500.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving, in a system information block type 4 (SIB-4), a neighbor cell list including information indicating one of a plurality of values including a first value, indicating an offset of an energy level of a resynchronization signal (RSS) of a neighbor cell relative to a cell-specific reference signal (CRS) of the neighbor cell, and a second value indicating not to perform a measurement; and
   based at least in part on the neighbor cell list, performing the measurement or refraining from performing the measurement.

2. The method of claim 1,
   wherein the energy level is an energy per resource element (EPRE) of the RSS of the neighbor cell relative to an EPRE of the CRS of the neighbor cell.

3. The method of claim 1,
   wherein the neighbor cell list is provided via a serving cell of the UE.

4. The method of claim 1,
   wherein the neighbor cell list comprises a plurality of neighbor cells, wherein, for each of the plurality of neighbor cells, the information indicates one of the plurality of values.

5. The method of claim 1,
   wherein the first value indicates a difference between the energy level of the RSS of the neighbor cell and an energy level of the CRS of the neighbor cell.

6. The method of claim 5,
   wherein the first value comprises a quantization of the difference between the energy level of the RSS of the neighbor cell and the energy level of the CRS of the neighbor cell.

7. The method of claim 1,
   wherein a range of the offset is based at least in part on at least one of:
      a power boost parameter of the RSS,
      a number of CRS ports used by the neighbor cell,
      a power boost parameter of the CRS of the neighbor cell, a capability signaling of the neighbor cell, or
   a measurement object configuration.

8. The method of claim 1,
   wherein the measurement is performed when the offset is within a configured range.

9. The method of claim 1,
   wherein the first value indicates that the offset is outside of a configured range and that the measurement is not to be performed.

10. The method of claim 1,
    wherein performing the measurement or refraining from performing the measurement comprises:
       combining an RSS-based measurement and a CRS-based measurement to determine the measurement.

11. The method of claim 10,
    wherein combining the RSS-based measurement and the CRS-based measurement to determine the measurement is based at least in part on the offset being within a range.

12. The method of claim 1, wherein performing the measurement or refraining from performing the measurement comprises:
    when the neighbor cell is associated with a different frequency than a serving cell of the UE, performing the measurement based at least in part on the offset and a frequency offset.

13. A method of wireless communication performed by a network node, comprising:
    receiving, from a neighbor network node associated with a neighbor cell, information indicating one of a plurality of values including a first value, an offset of an energy level of a resynchronization signal (RSS) of the neighbor cell relative to a cell-specific reference signal (CRS) of the neighbor cell, and a second value indicating not to perform a measurement; and
    transmitting, in a system information block type 4 (SIB-4), a neighbor cell list including the information.

14. The method of claim 13,
    wherein the energy level is an energy per resource element (EPRE) of the RSS of the neighbor cell relative to an EPRE of the CRS of the neighbor cell.

15. The method of claim 13,
    wherein the neighbor cell list comprises a plurality of neighbor cells, wherein, for each of the plurality of neighbor cells, the information indicates one of the plurality of values.

16. The method of claim 13,
    wherein the first value indicates a difference between the energy level of the RSS of the neighbor cell and an energy level of the CRS of the neighbor cell.

17. The method of claim 16,
    wherein the first value comprises a quantization of the difference between the energy level of the RSS of the neighbor cell and the energy level of the CRS of the neighbor cell.

18. The method of claim 13,
    wherein a range of the offset is based at least in part on at least one of:
       a power boost parameter of the RSS,
       a number of CRS ports used by the neighbor cell, or
       a power boost parameter of the CRS of the neighbor cell,
       a capability signaling of the neighbor cell, or
       a measurement object configuration.

19. The method of claim 13, further comprising:
    configuring a user equipment (UE) to perform the measurement when the offset is within a configured range.

US 12,574,871 B2

19

20. The method of claim 13,
wherein the first value indicates that the offset is outside of a configured range and that the measurement is not to be performed.

21. A user equipment (UE) for wireless communication, comprising:
one or more memories; and
one or more processors, coupled to the one or more memories, which are configured, individually or in any combination, to:
receive, in a system information block type 4 (SIB-4), a neighbor cell list including information indicating one of a plurality of values including a first value, indicating an offset of an energy level of a resynchronization signal (RSS) of a neighbor cell relative to a cell-specific reference signal (CRS) of the neighbor cell, and a second value indicating not to perform a measurement; and
based at least in part on the neighbor cell list, perform the measurement or refrain from performing the measurement.

22. A network node for wireless communication, comprising:
one or more memories; and
one or more processors, coupled to the one or more memories, which are configured, individually or in any combination, to:
receive, from a neighbor network node associated with a neighbor cell, information indicating one of a plurality of values including a first value, an offset of an energy level of a resynchronization signal (RSS) of the neighbor cell relative to a cell-specific reference signal (CRS) of the neighbor cell, and a second value indicating not to perform a measurement; and
transmit, in a system information block type 4 (SIB-4), a neighbor cell list including the information.

20

23. The UE of claim 21,
wherein a range of the offset is based at least in part on at least one of:
a power boost parameter of the RSS,
a number of CRS ports used by the neighbor cell,
a power boost parameter of the CRS of the neighbor cell,
a capability signaling of the neighbor cell, or
a measurement object configuration.

24. The UE of claim 21,
wherein the measurement is performed when the offset is within a configured range.

25. The UE of claim 21,
wherein the first value indicates that the offset is outside of a configured range and that the measurement is not to be performed.

26. The network node of claim 22,
wherein a range of the offset is based at least in part on at least one of at least one of:
a power boost parameter of the RSS,
a number of CRS ports used by the neighbor cell,
a power boost parameter of the CRS of the neighbor cell,
a capability signaling of the neighbor cell, or
a measurement object configuration.

27. The method of claim 5, wherein the quantization is in terms of decibels (dB).

28. The UE of claim 21,
wherein the first value indicates a difference between the energy level of the RSS of the neighbor cell and an energy level of the CRS of the neighbor cell.

29. The UE of claim 28,
wherein the first value indicates a quantization of the difference.

30. The UE of claim 29,
wherein the quantization is expressed in terms of decibels.

* * * * *